Oct. 29, 1935. W. S. EATON 2,019,403
RADIO DIRECTION INDICATOR
Filed Dec. 3, 1930 3 Sheets-Sheet 1

INVENTOR:
Warren S. Eaton,
BY Frank R. Abraham
ATTORNEY.

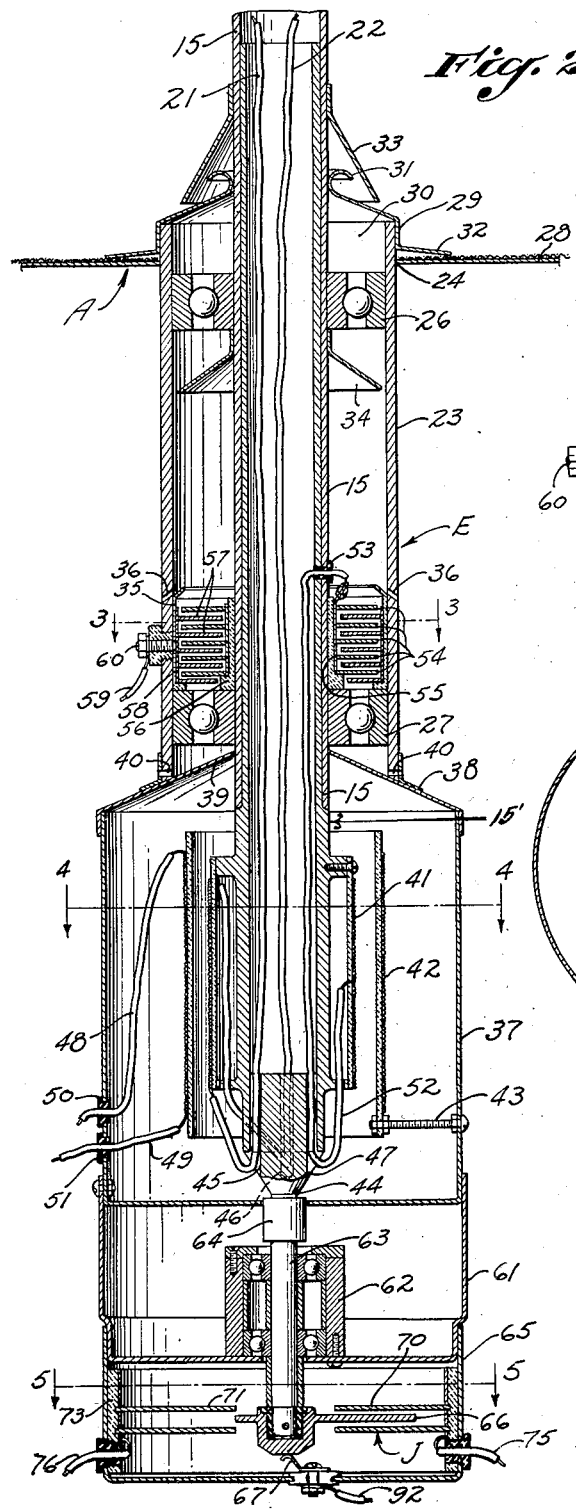
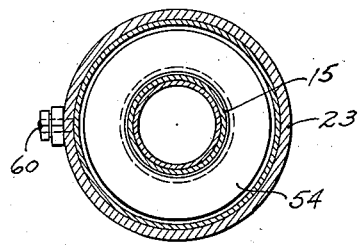
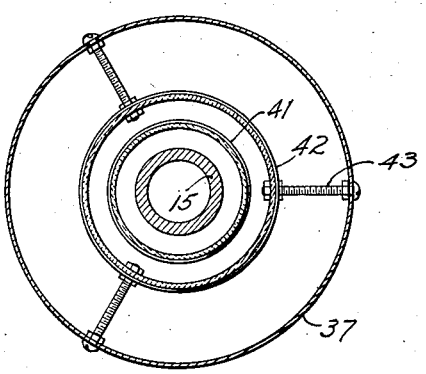

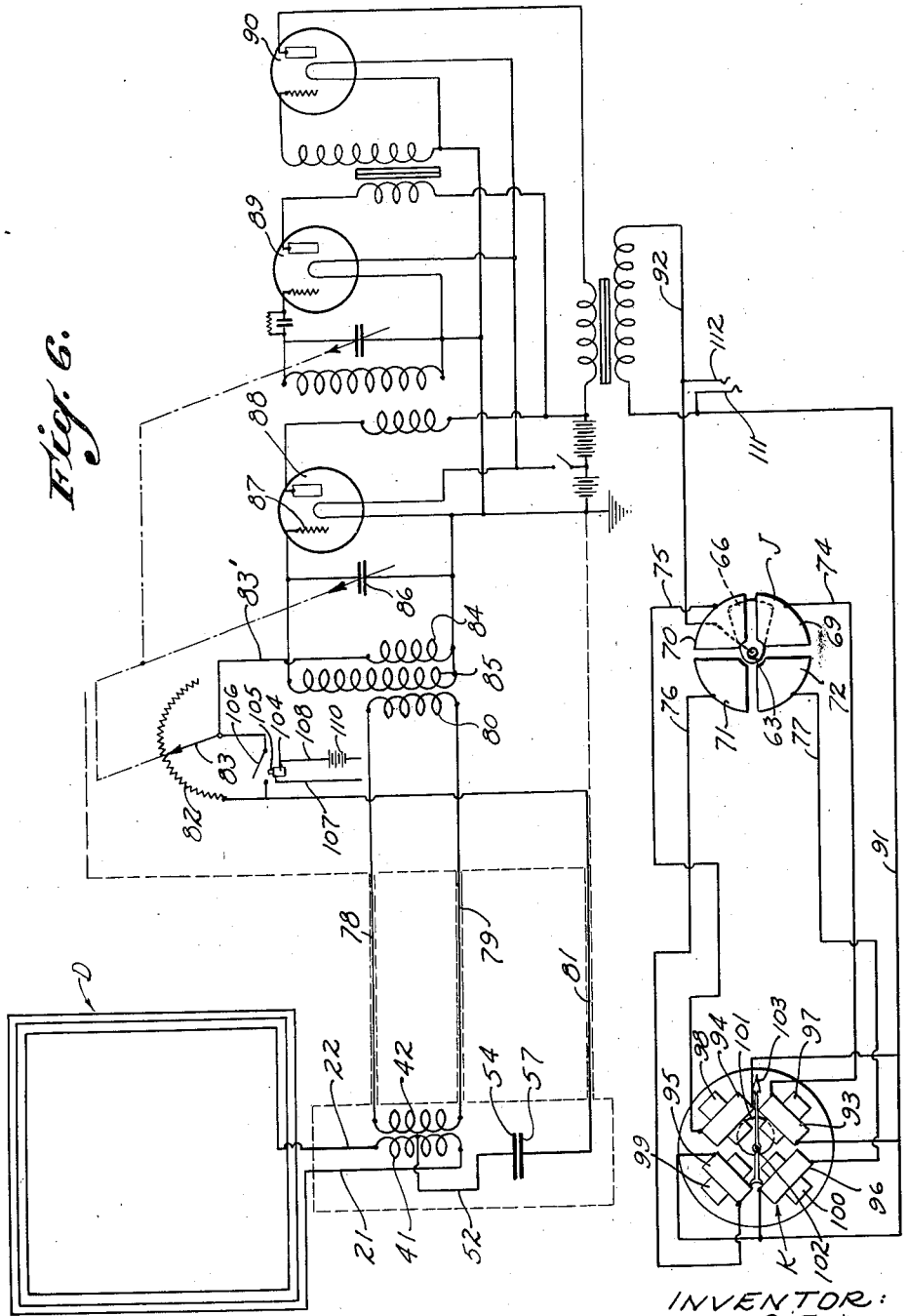

Patented Oct. 29, 1935

2,019,403

UNITED STATES PATENT OFFICE 2,019,403

RADIO DIRECTION INDICATOR

Warren S. Eaton, Los Angeles, Calif.

Application December 3, 1930, Serial No. 499,735

19 Claims. (Cl. 250—11)

The invention contemplates, in its broadest sense, the use of a continuously rotating loop antenna, in conjunction with suitable instrumentalities for transferring, combining, and amplifying the energies received by the rotating loop antenna to produce a visual indication of the direction of an incoming radio wave; the whole system being inductively and capacitatively connected throughout to produce a smooth uninterrupted result.

The present invention refers particularly to my prior Patent No. 1,842,343 entitled "Method and apparatus for indicating direction", parts of which application and principles involved in said application may be utilized in the present invention.

Broadly speaking, the objects of the invention are:

To transfer the received energy to the radio receiver so as to eliminate all frictional sliding contacts;

To provide a housing wherein the movable parts of my device are accurately and rigidly held in place and are protected from any action of the elements or from getting out of adjustment due to warping or handling;

To provide for adjustably phasing and combining the vertical component and the alternating phases of the loop signal of the received energy to produce and maintain over the full frequency range of the receiver a cardioid output pattern of any desired proportions;

To provide in said receiver means for changing fresuencies at which said set operates without disturbing the phased relation between the vertical component and the loop signal of the received energy;

To produce a rotor for a direction indicator commensurate in size and shape with the pattern of the output signal;

To visually and automatically indicate the approaching direction of the received energy; and To provide in the receiving set a means of converting the cardioid output pattern into a substantially round pattern so that the output signal will not have the rise and fall due to the single maximum of a cardioid pattern, and may be utilized for listening in with head phones for spoken signals.

Other objects and advantages will become apparent as the description proceeds in conjunction with the drawings, in which:

Fig. 2 is a sectional view taken substantially on the lines 2—2 of Fig. 1;

Fig. 3 is a cross sectional view taken on the line 3—3 of Fig. 2;

Fig. 4 is a cross-sectional view taken on the line 4—4 of Fig. 2;

Fig. 6 is a schematic diagram showing the wiring and the instrumentalities.

Figure 1:
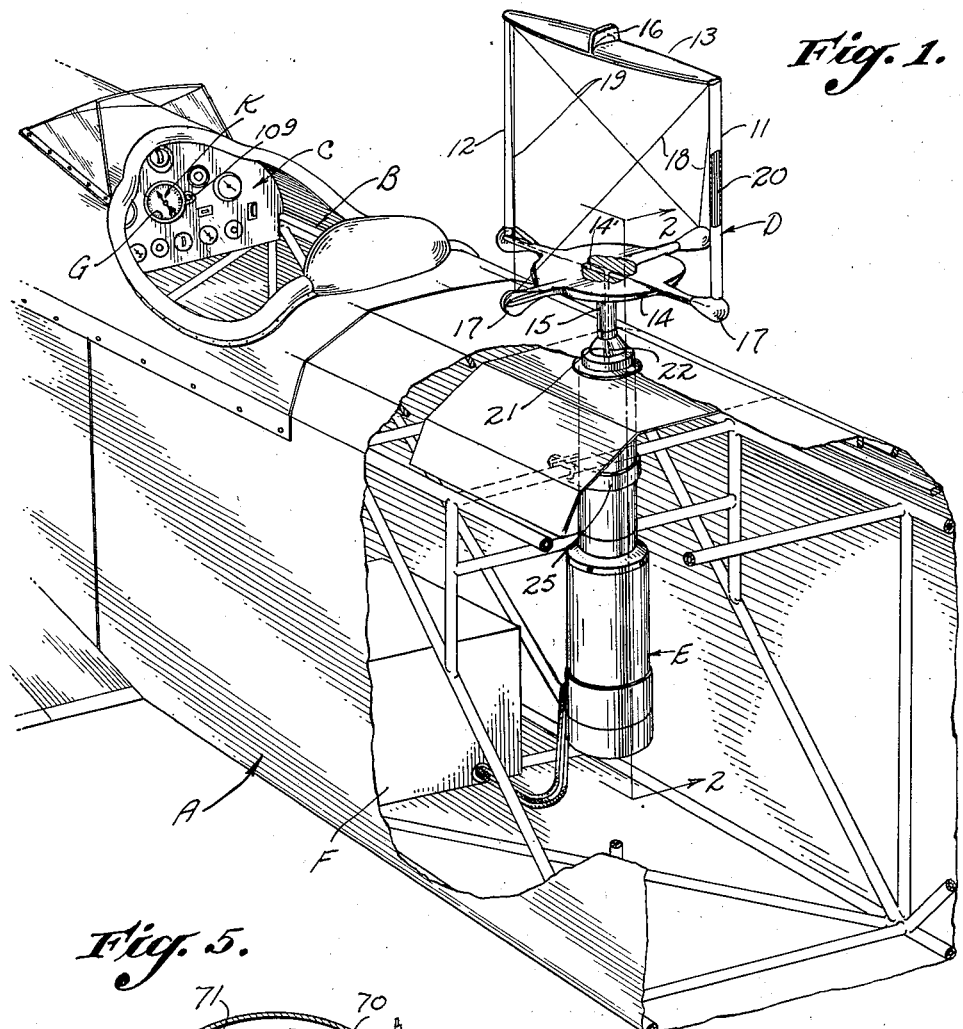
Fig. 1 is a fragmentary perspective of an airplane fuselage showing how my invention would appear when installed thereon.

It is common knowledge that there are two component energies received on a loop antenna. One is due to the space disposition of the wires in the vertical members of the loop and hereinafter will be referred to as the loop signal. The other component is due to the open antenna effect of the loop as a whole which possesses capacity with respect to the grounded members, and hereinafter will be referred to as the vertical component.

In my above-mentioned patent, I disclose a method of resolving the received electro-magnetic energy into a field of force having a single maximum. The present invention embodies an improvement upon this application, in that the electro-magnetic energy is received by a rapidly revolving loop antenna, which loop, by virtue of rotation, continuously changes the phase of the loop signal, and that this signal is continuously combined with the constantly phased vertical component to produce a cardioid pattern of the output energy which produces the effect of a field of force having predetermined relation to the direction of the received energy.

The loop signal is conducted through a coil which rotates in unison with the loop. This coil is preferably concentrically arranged within a stationary outer coil, and is inductively coupled thereto. The two coils serve as a means of transferring the loop signal to the receiving set. The vertical component of the signal is separated from the loop signal and is taken from the revolving coil and by means of rotative plates, which rotate between fixed plates, the vertical component is capacitatively conducted to the receiving set. The incoming loop signal, with its alternating phases, due to the rotation of the loop, is then inductively and capacitatively combined with the vertical component in the radio receiver to produce a cardioid pattern for the input signal.

To combine these energies I have provided in the receiver, means for phasing and regulating the amount of the vertical component to combine it in proper phase relation with the loop signal in a manner to produce and maintain over the necessary band of frequencies a cardioid pattern of any desired proportions.

It is known to those familiar with the art that the current flowing in an aperiodic loop antenna circuit, which supplies the loop signal energy in this system, lags a few degrees less than 180° behind the flux in the wave inducing the current; that a reduction in the natural period of the open or aperiodic antenna which supplies the vertical component causes the current flowing therein to lead the flux in the wave inducing it; that variable resistance introduced into the open antenna circuit can be adjusted to reduce the lead by any amount desired to bring it into approximate or exact phase alignment or 180° opposition with the current in the loop antenna; that the amount of coupling of the two circuits to a third circuit can be adjusted to obtain any desired amount of balance between them, resulting in any desired cardioid pattern as the loop revolves; and that the variable resistance introduced into the open antenna circuit is not critical. It is not necessary in this invention to produce and maintain exact phase alignment or 180° opposition of the currents of the loop signal and the vertical component, it only being desirable to obtain approximate phase alignment or 180° opposition of the currents and to maintain this phase relation over the necessary band of frequencies. The rotor of the indicator K can be proportioned to utilize the resulting cardioid pattern. I have also incorporated means for variably adjusting the receiver so that it will receive waves over a wide band of frequencies without in any way disturbing the phase relation between the vertical component and the loop signal. The output signal of the radio receiver and amplifier is conducted to an output commutator which is operated synchronously with the revolving loop. This commutator serves to distribute the output energy to the component members of any one of a number of direction indicators, such as are exemplified in the aforementioned Patent No. 1,842,343 or in another prior Patent No. 1,842,345, entitled Radio operated direction indicator.

Referring to the drawings, and particularly to Fig. 1, I have shown a fragmentary perspective of a fuselage of an airplane, and have designated it A. The fuselage A is equipped with the usual cockpit B, and an instrument board, designated C, mounted upon the fuselage. I have shown my invention as comprising the following units: A rotating loop, designated D; a cylinder E, which houses part of the instruments used in my device; a radio receiver F; and a visual indicator K, mounted upon the instrument board.

More specifically describing the above enumerated units in the order set forth, the unit D comprises a pair of vertical members 11 and 12 connected at their upper ends by a cross member 13, and all of said members being mounted upon a disk 14, said disk in turn being mounted upon a shaft 15 which rotatably extends into the casing E.

It is a part of this invention that the unit D rotates by the force of the air as the ship travels, accordingly I have equipped the disk 14 with anemometer cups 17. As a means of strengthening the members 11, 12, and 13, I may provide guy wires 18 and 19, which are arranged to rigidly hold the members 11 and 12 in a vertical position upon the disk 14. The members 11, 12, and 13 are hollow members, and the disk 14 has a passage 14' communicating with the ends of the hollow members 11 and 12.

The antenna wire, shown at 20, in the broken-away section of the element 11, is placed inside the hollow members and the passage in the disk 14, and the ends extend through the shaft 15, as shown at 21 and 22, into the casing E.

Referring to the unit E, which is shown in vertical section in Fig. 2, it is seen to comprise a casing 23 extending through an opening 24 in the fuselage A. Means for supporting the casing may comprise any suitable support, such as a clamp 25, the details of which are not shown.

The shaft 15, upon which the rotating loop is mounted, extends into the casing 23, and is journaled therein by means of ball bearings 26 and 27, the bearings 26 and 27 forming a supporting means for the shaft as well as a bearing means; such structure to be more specifically described hereinafter.

Surrounding the casing 23 and mounted upon the top of the fuselage A, I provide a metal plate or screen 28, which acts in the nature of a shield for the parts within. Also mounted over the top of the casing E, I provide a sealing member 29 which acts in the nature of a weather seal and prevents moisture or air from entering through the opening 24 around the casing 23, or from entering the annular space 30 between the casing 23 and the shaft 15. The sealing member 29 extends inwardly toward the shaft 15, and is provided with a return bend 31, which surrounds the shaft 15. The outer periphery of the member 29 is provided with a flange 32 that fits down upon the top of the fuselage.

As an added means of preventing moisture from penetrating into the casing 23, I secure a hood 33 upon the shaft 15, and extend the lower end of the hood over the return bend 31 on the member 29. This provides a substantially element-proof arrangement between the upper end of the casing 23 and the shaft 15.

Below the bearing 26 I secure a hood member 34, which is arranged to receive any oil which may drop from the bearing, and throw the oil against the inner wall of the casing where it may slip down the wall and pass out of the casing by encountering a sleeve 35 which is arranged to direct the oil outwardly through apertures 36 provided in the wall of the casing 23. Mounted on the lower end of the casing 23 is a compartment 37, which is secured to the lower end of the casing by means of an annular flange 38, or in any other suitable manner. The upper end of the compartment 37, as shown at 39, is sloping, and extends inwardly to the shaft 15. This provides a means of protecting the interior of the compartment 37 from any oil which may drop from the bearing 27. As shown, any oil which comes from the bearing 27 falls upon the sloping wall 39 and is drawn outwardly through openings 40 provided in the casing 23.

The shaft 15 extends through the casing 23 and into the metal compartment 37. On the lower end of the shaft 15 I mount an extension 15' composed of suitable dielectric material and on the extension 15' I rigidly mount a coil 41 which, by virtue of said construction, is arranged to rotate with the shaft 15. Surrounding said coil, and preferably concentric therewith, is a second coil 42, which is termed the stationary coil, and is secured to the wall of the casing 37 by means of bolts 43.

The wires 21 and 22, which connect with the antenna loop in the rotating frame D, are brought down the interior of the hollow shaft 15, and are brought out at the lower end of the shaft through a member 44, which is secured therein, which member is provided with a series of vertical grooves 45, 46, and 47.

The conductor 21 passes through the groove 45, and is connected to one end of the coil 41. The other conductor 22 passes through the groove 46, and is connected to the opposite end of the same coil. This will be recognized as providing a closed circuit for the loop antenna, or of incorporating in series with said loop the coil 41.

Leading from the coil 42 are conductors 48 and 49, which are connected with opposite ends of said coil. The conductors 48 and 49 pass through insulating bushings 50 and 51, respectively, in the wall of the compartment 37, and are connected to a receiving set to be more fully described hereinafter.

In this invention the vertical component is utilized in connection with the loop signal to produce a cardioid pattern of the output energy. This is accomplished by separating it from the loop signal by means of a conductor 52, which connects with the coil 41, and enters the hollow shaft 15 through the vertical slot 47 in the member 44. The conductor then passes upwardly through the shaft 15, and outwardly of the shaft through an insulating bushing 53. It is then connected to plates 54, which are arranged to rotate with the shaft 15. The plates 54, in turn, are mounted upon a connecting sleeve 55, which seats upon an insulating sleeve 56, said insulating sleeve being secured to the shaft 15.

The plates 54 are arranged to rotate between the stationary plates 57, said stationary plates being mounted upon a connector sleeve 58, which connector sleeve in turn is held within the insulating sleeve 35.

The means for conducting the current collected by the stationary plates to the set consists of a conductor 59 connected to a binding post 60, which is connected to the sleeve 58.

Mounted below the compartment 37, and preferably detachably connected therewith, is another compartment, designated 61, in its entirety. This compartment contains ball bearings 62, into which a stub shaft 63 is rotatably mounted. The upper end of the stub shaft 63 is universally connected with the lower end of the element 44 by means of a slip universal joint 64. The shaft 63 extends through the bottom part of the compartment 61 and into another compartment 65, which may optionally be detachably mounted upon the compartment 61.

Mounted upon the lower end of the shaft 63 I have provided a commutator, designated J in its entirety, embodying the principles of the commutators described in my above mentioned Patent No. 1,842,343. This commutator comprises a rotor plate 66 secured to the shaft 63 and adapted to rotate therewith. It is to be understood that the rotor plate 66 rotates in unison with the shaft 15, and that the shaft 15, being driven by the rotation of the loop D, there is a relation between the angular position of the rotor 66 and to the maximum or minimum receiving position of the loop. Accordingly, the rotor 66 may be placed either in a position on the shaft which corresponds to the maximum or the minimum receiving position of the loop, preferably the maximum receiving position, though this is not essential as the needle of the indicating device K may be so positioned in relation to the rotor of same, that true direction is indicated.

When it is desirable to use direct current in the indicating device K, this may be accomplished by placing a rectifier in the output circuit of the receiving set, and it will be understood, of course, that while the commutator J is shown and described as a capacity commutator, a contact commutator which may comprise a plurality of brushes and a revolving contact segment associated with a slip ring might be substituted for the capacity commutator without impairing the operation of the instrument.

The rotor 66 is arranged to rotate between segmental plates 69, 70, 71, and 72, which are mounted upon the wall of the compartment 65, and are insulated therefrom by means of insulation shown at 73. Separate conductors, designated 74, 75, 76, and 77, lead from the segmental plates, respectively, to a visual indicating device K, to be later described.

Reference will now be made to Fig. 6 for a description of the receiving set F, wherein the incoming signal is converted to a signal having a single maximum, and where it is amplified before being conducted to the commutator J in the compartment 65. In this figure the loop is shown at D, and the wires 21 and 22 are shown leading from the loop D to the rotating coil 41. The current from the loop D and the coil 41 is inductively transferred to the coil 42, which, in turn, is connected through shielded conductors 78 and 79 through a coil 80.

The vertical component, separated from the loop signal is taken from the coil 41 and is conducted through 52 to te rotating plates 54 from where it is capacitatively transferred to the stationary plates 57. From 57 the current is conducted by a conductor 81 to a phasing resistance 82. The phasing resistance is utilized to reduce the vertical component and to adjust it to a phased relation with respect to the incoming loop signal to produce a cardioid input signal. The current from 82 is picked up by contact finger 83, and conducted to a coil 84 by means of conductor 83'. In inductive and capacitive relation to the coils 80 and 84 I have provided a coil 85.

Across the coil 85 I install a variable condenser 86, and synchronize the condenser 86 with the contact finger 83, which allows a uni-remote control to the system. By means of synchronously operating the condenser 86 with the contact finger 83, I am enabled to vary the frequency tuned while maintaining the proper phased relation between the vertical component and the loop input signal. The resultant signal, having a maximum for a predetermined position of the continuously rotating loop, is then impressed upon a grid 87 of a vacuum tube 88. The signal is detected by vacuum tube 89 and may be amplified in any suitable manner, such as I have shown in the amplifying unit 90. The output energy, in its amplified form, is taken from the receiving set F through conductors 91 and 92. The conductor 92 is connected to the rotor 66 of the commutator J by means of the finger 67 in Fig. 2. The other conductor 91 of the circuit is connected to an indicator K.

The indicator K is preferably one shown in my aforementioned Patent No. 1,842,345, and consists of the four electro-magnetic U-shaped field pieces 97, 98, 99 and 100, having wire coils 93, 94, 95 and 96 mounted respectively thereon. A flux-carrying member 101 is mounted to rotate through the air gaps, of the said electro-magnetic elements, and is secured to shaft 102 on which is positioned in a predetermined angular relation the indicator needle 103.

Figure 5:
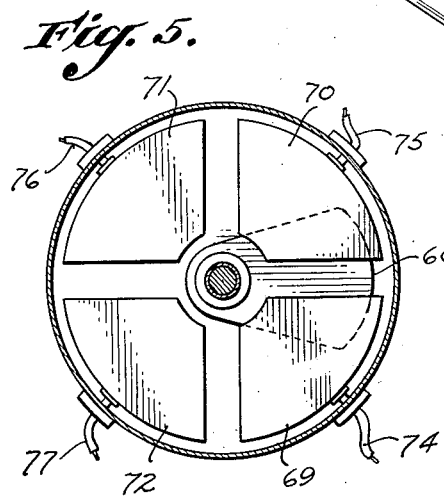
Fig. 5 is a cross-sectional view taken on the line 5—5 of Fig. 2.

The output conductor 92 of the radio receiver F is in electrical connection through contact finger 67 with rotor vane 66 of the output commutator J in Fig. 2. Rotor vane 66 as shown in Figs. 2, 5 and 6, is mounted to rotate between, and in capacitive relation with, the stationary sets of segmental plates 69, 70, 71 and 72 which plates are electrically connected to one end of the coils 93, 94, 95 and 96 respectively by conductors 74, 75, 76 and 77 respectively. The other ends of these wire coils are all in common electrical connection to output conductor 91. From the above description, it will be seen that the output energy flowing through conductor 92 is capacitively conducted by rotor 66 through the stationary vanes of the output commutator J and through conductors 74, 75, 76 and 77 to their respective field coils in the indicator K returning through the conductor 91 to the output transformer of the radio receiver. As the vane 66 rotates synchronously with and in predetermined angular relation to the revolving loop D it will distribute the cardioid shaped output energy to the various electro-magnetic field pieces in the indicator K creating therein fields of force, the effect of which is a single field of force, bearing a predetermined relation to the direction of the received energy, which will influence the rotor 101 to assume a balanced position in the said direction. The indicator 103 being positioned in predetermined relation to the rotor 101 will then indicate the direction of the received electromagnetic energy, as disclosed in my previously mentioned Patent No. 1,842,343.

I provide means whereby the output energy having a cardioid pattern for operating the direction indicator may be converted into a substantially round pattern, so that it may be used for audible reception. If the vertical component which is stronger than the loop signal and is of equal strength in all directions is caused to predominate, a substantially round pattern of the output energy will result. If, then, the phasing resistance 82 is shunted, the vertical component will predominate and produce a satisfactory signal for using head phones or the like. For this purpose I have provided a relay switch comprising a coil 104, forming an electromagnet 105 arranged to operate a switch blade 106. The coil 104 is provided with leads 107 and 108, which leads are in turn connected to a push button 109 mounted on the instrument board C. Said push button 109 may be a part of the device K, or may be mounted in any other suitable place.

It is understood that a source of energy, such as a battery 110, is incorporated in the circuit to the coil 104. With this arrangement, the pilot may, by pressing the push button 109, shunt the resistance 82 and convert the output of the receiving set into understandable signals.

For the purpose of connecting head phones, I have shown telephone jacks 111 and 112 connected to the conductors 91 and 92, respectively.

In operation, an incoming signal from any direction is impressed upon the loop D, which, by virtue of its continuously and rapidly rotating function is a universal loop, i. e., it is a loop capable of receiving signals from any direction. The received energy is then conducted to the receiving set, the loop signal by means of conductors 21 and 22, coils 41 and 42, conductors 78 and 79, and coil 80, and the vertical component is here separated from the loop signal by being taken from the coil 41 by means of a conductor 52, plates 56 and 57, conductor 81, phasing resistance 82, contact finger 83, conductor 83', and coil 84. The vertical component and the loop signal are then inductively and capacitively combined by means of coils 80, 84, and 85 to produce a cardioid input pattern, which is detected and amplified in any suitable manner and has a predetermined relation to the direction of the incoming signal. The amplified output energy is then conducted to the commutator J, where it is selectively transferred by means of the rotor 66 to the sets of fixed segmental plates 69 to 72 and in turn to their respectively connected coils 93 to 96 in the indicating device K, where the needle 103 indicates the direction of the incoming signal. The whole device operates automatically and indicates direction visually. It is obvious that the current in all occasions is inductively and capacitatively conducted from the receiving loop to the indicating needle.

The device, as I have described it, is especially useful for piloting airplanes, but may also find general usefulness in stationary stations, such as land stations, and for navigating ships at sea. For land stations some means of motive power would be necessary to rotate the loop, the remaining parts would be substantially the same. For ships at sea wind might at times be sufficient to rotate the loop, but I prefer to embody a means for rotating the loop.

While the present invention is based on direction indication, and it has been described that the indicator needle will swing into the line of direction to the source of the received energy, it will of course be understood that this will occur only when the indicator needle is in a horizontal position. However, the indicator needle will always turn to the same position on the dial when indicating the same line of direction, regardless of the position of the instrument, and therefore when the face of the instrument is not disposed horizontally, as when the instrument is mounted on an instrument board, it should be arranged so that the needle will be in an upright position when the vehicle is headed along the line of direction indicated by the indicator needle of the instrument.

Although I have shown a single specific embodiment of my invention, nevertheless I am aware that certain modifications and refinements may be resorted to in the production of my device. I, therefore, reserve the right to all such alterations which, under the doctrine of equivalents, comes within the scope of the disclosure and the purview of the appended claims.

I claim as my invention:

1. Radio receiving apparatus embodying: a loop antenna secured to a rotatable shaft; means for continuously rotating said loop and said shaft; a coil mounted upon said shaft and arranged to rotate therewith, said coil being connected in series with said loop; a fixed coil arranged in inductive relation with said rotatable coil; a conductor connected to substantially a midpoint of said rotatable coil; and means for combining the output of said fixed coil with the output of said conductor.

2. Radio receiving apparatus embodying: a loop antenna secured to a hollow rotatable shaft; anemometer cups for continuously rotating said loop and said shaft; a coil mounted upon said shaft; conductors passing through said hollow shaft and connecting said rotatable coil in series with said loop; a fixed coil arranged concentrically with said rotatable coil; a conductor connected to substantially the midpoint of said rotatable coil; and means for combining the output of said fixed coil with the output of said conductor.

3. Radio receiving apparatus embodying: a loop antenna secured to a rotatable shaft; means for rotating said antenna and said shaft; a movable coil mounted upon said shaft and rotatable therewith; a fixed coil surrounding said movable coil and annularly spaced therefrom; plates mounted upon said shaft for rotation therewith; fixed plates extending between said rotatable plates; means for connecting substantially the midsection of said rotatable coil to said rotatable plates; and means for combining the output from said fixed coil with the optput from said fixed plates.

4. In a radio operated direction indicator having a loop antenna, means for continuously rotating the antenna and a radio receiving set: means for capacitively connecting the vertical component of the electromagnetic energy received by said loop to said receiving set, said means having constant capacity and embodying continuously rotating plates and fixed plates.

5. In a radio operated direction indicator having a rotatable loop antenna and a radio receiving set: means for inductively conducting the loop signal of the energy received by said loop to said receiving set; means for capacitatively conducting the vertical component of said energy to said receiving set; means for tuning said receiving set, phasing means, said tuning means being operable to automatically actuate the phasing means to phase said vertical component with said loop signal to maintain a constant pattern of the output signal for various frequencies of the received energy.

6. The combination with a rotatable loop antenna and means for continuously rotating said antenna, of means for inductively and capacitively combining the vertical component and the loop signal of the electro-magnetic energy received by said antenna, means for varying the tuned frequency of the received energy, means for maintaining a constant phase relation between said vertical component and said loop signal, and a single means for operating simultaneously said last two mentioned means.

7. The combination with a rotatable loop antenna and means for continuously rotating said antenna, of means for combining the vertical component and the loop signal of the electro-magnetic energy received by said antenna, means to produce an output pattern having a single maximum, means for commutating said output energy including a rotor actuated synchronously with and arranged in a predetermined relation to said loop antenna, and fixed angularly spaced conductors arranged to be energized respectively by said rotor.

8. In a radio operated direction indicator having a rotatable loop antenna, means for rotating said antenna, means for inductively and capacitively combining received electro-magnetic energy into an input pattern having a single maximum, means for amplifying said energy, means for commutating said amplified energy including a rotor actuated in synchronism with said antenna and arranged in predetermined angular relation with respect to the maximum receiving position of said antenna, fixed segmental plates arranged to be energized respectively by said rotor, and an indicator operably connected to said fixed plates to visually indicate the direction of said received energy.

9. In a radio operated direction indicator having a rotatable loop antenna and means for rotating said antenna, means for inductively and capacitively combining received electro-magnetic energy and producing an input pattern having a single maximum, means for amplifying said energy, means for commutating said energy, and an indicator operably connected to said commutator to visually indicate the direction of said received energy.

10. In combination with a rotatable loop antenna, means for producing by electro-magnetic energy received by said antenna an output pattern having a single maximum, an indicator having a rotor shaped substantially to the shape of said output pattern, and means for commutating and conducting the energy of said output pattern to said indicator.

11. In a radio operated direction indicator having a loop antenna mounted on a shaft, means for continuously rotating the antenna and a radio receiving set, means for electrically connecting said loop to said receiving set, said means including a rotatable coil mounted on said shaft and a fixed coil in inductive relation therewith, and a constant capacity element having fixed and rotatable members, said rotatable member being secured to said shaft.

12. A radio operated direction indicator comprising rotatable means for receiving electromagnetic energies, means for transferring the received energies to a radio receiving and amplifying apparatus, means for phasing and combining the transferred energies into usable energy, means for amplifying the usable energy, means for commutating said usable energy, means for utilizing said commutated energy to create fields of force having the effect of a single field of force bearing a predetermined direction with respect to the incoming signal, and a direction indicator actuated by said fields of force to indicate the direction of the incoming signal.

13. The combination of a rotatable loop antenna, a receiving apparatus, rotatable inductance and capacitance means for transferring the vertical component and the loop signal of the electro-magnetic energy received by said antenna to said receiving apparatus, means for continuously rotating said antenna and said inductance and capacitance means, means for separating said vertical components from said loop signal and means for phasing said vertical component to a phased relation with respect to said loop signal.

14. The combination of a rotatable loop antenna, a receiving apparatus, rotatable inductance means for transferring the loop signal of the energy received by said antenna to said receiving apparatus, rotatable capacitance means for transferring the vertical component of said received energy to said receiving apparatus, and means for continuously rotating said antenna, inductance and capacitance means.

15. The combination of a rotatable loop antenna, a receiving apparatus, means for separating the electro-magnetic energies received by said antenna into their components, rotatable means for transferring said separated energies to said receiving apparatus, and means for continuously rotating said antenna and said transferring means.

16. The combination of a rotatable loop antenna, a receiving apparatus, means for separating the electro-magnetic energies received by said antenna into their components, rotatable inductance and capacitance means for transferring said separated energies to said receiving apparatus, and means for continuously rotating said antenna and said inductance and capacitance means.

17. The combination of a rotatable loop antenna, a receiving apparatus, means for separating the vertical component and the loop signal of the electro-magnetic energies received by said antenna, rotatable capacitance means for transferring the vertical component of said energy to said receiving apparatus, rotatable inductance means for transferring the loop signal of said energy to said receiving apparatus, and means for continuously rotating said antenna and said capacitance and inductance means.

18. The combination of a rotatable loop antenna, a receiving apparatus, means for separating the electromagnetic energies received by said antenna into their components, rotatable inductance and capacitance means for transferring said separated energies to said receiving apparatus, means for continuously rotating said antenna and said inductance and capacitance means, and means for producing an output pattern by said separated received energies.

19. The combination of a rotatable loop antenna, a receiving apparatus, rotatable inductance and capacitance means for transferring the vertical component and the loop signal of the electromagnetic energy received by said antenna to said receiving apparatus, means for continuously rotating said antenna and said inductance and capacitance means, means for producing an output pattern having single maximum, and means for optionally causing said vertical component to predominate and produce a substantially round output pattern for audible purposes.

WARREN S. EATON.